United States Patent
Holmstrom et al.

(10) Patent No.: US 9,770,007 B2
(45) Date of Patent: *Sep. 26, 2017

(54) TEAT TREATMENT METHOD AND APPARATUS

(71) Applicant: DELAVAL HOLDING AB, Tumba (SE)

(72) Inventors: Kerstin Holmstrom, Tumba (SE); Henrik Olander, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 173 days.

This patent is subject to a terminal disclaimer.

(21) Appl. No.: 14/764,595

(22) PCT Filed: Feb. 5, 2014

(86) PCT No.: PCT/SE2014/050143
§ 371 (c)(1),
(2) Date: Jul. 30, 2015

(87) PCT Pub. No.: WO2014/148972
PCT Pub. Date: Sep. 25, 2014

(65) Prior Publication Data
US 2015/0366157 A1 Dec. 24, 2015

Related U.S. Application Data

(60) Provisional application No. 61/761,317, filed on Feb. 6, 2013.

(30) Foreign Application Priority Data

Feb. 6, 2013 (SE) .................................. 1350141-6

(51) Int. Cl.
*A01J 7/04* (2006.01)
*A01K 13/00* (2006.01)
(Continued)

(52) U.S. Cl.
CPC ............... *A01J 7/04* (2013.01); *A01J 5/0175* (2013.01); *A01K 13/001* (2013.01);
(Continued)

(58) Field of Classification Search
CPC ................................ A01J 7/04; A01K 13/001
(Continued)

(56) References Cited

U.S. PATENT DOCUMENTS 5,678,506 A * 10/1997 van der Berg ........ A01J 5/0175
119/14.18
6,443,094 B1 9/2002 DeWaard
(Continued)

FOREIGN PATENT DOCUMENTS

EP 0 191 517 B2 8/1986
EP 0 536 836 A1 4/1993
(Continued)

OTHER PUBLICATIONS

International-Type Search Report, dated Aug. 1, 2013, from corresponding PCT application.
(Continued)

*Primary Examiner* — David Parsley
(74) *Attorney, Agent, or Firm* — Young & Thompson

(57) ABSTRACT

Automatic teat treatment method and apparatus for treatment operations on teats of an animal using a robot apparatus. The method includes initiating automatic detection of spatial teat positions and registering the spatial positions of the detected teats; and deriving a dedicated treating action effective to move the treating device through a dedicated path defined by the registered spatial teat positions and carrying out treatment by moving the treating device through the dedicated path. When not all of the spatial positions are detected, then the method registers the spatial position of each detected teat and derives an adapted treating action effective to move the treating device through an adapted path defined by the registered spatial teat positions and by approximated spatial locations. When no teat spatial
(Continued)

Figure 1:
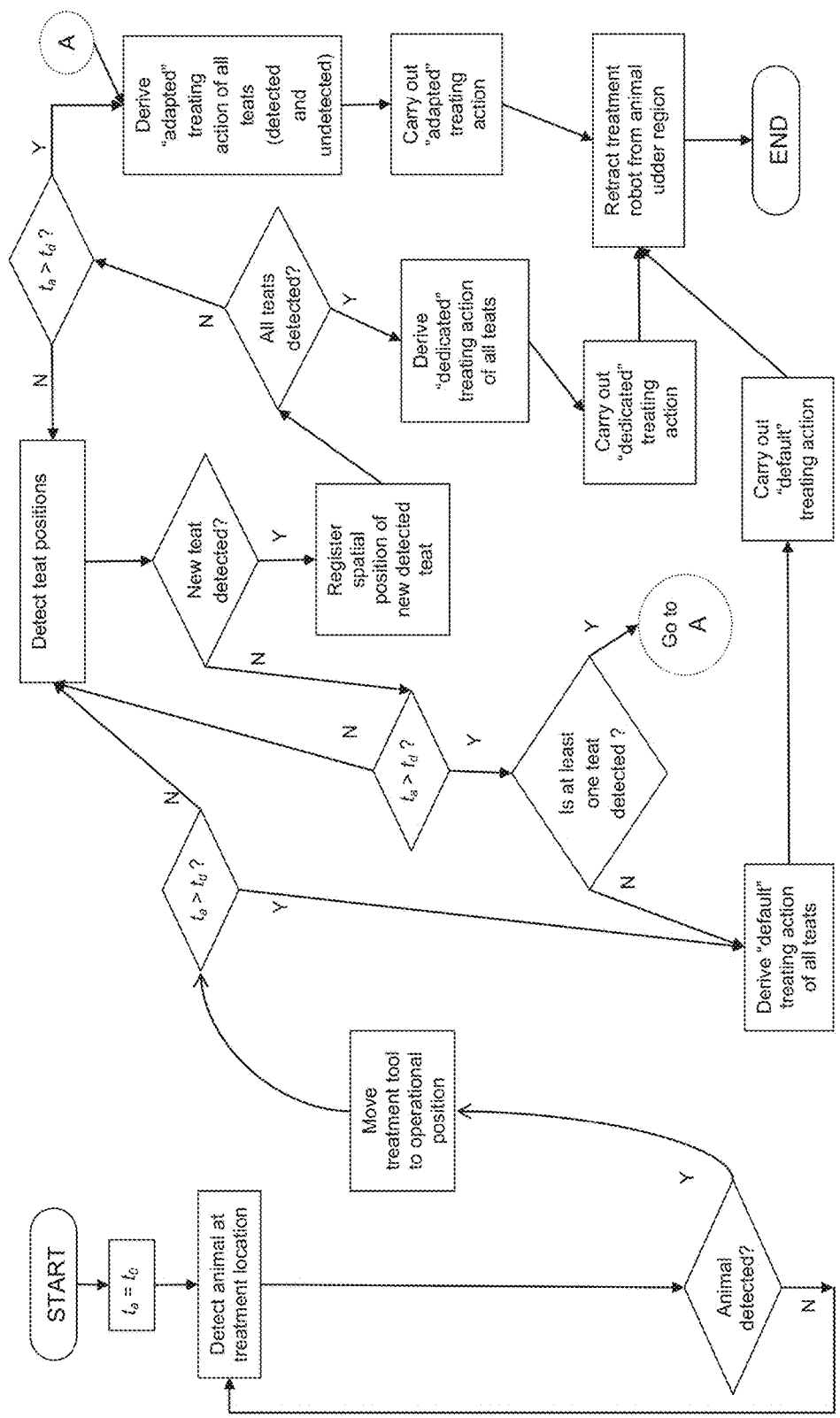

positions have been detected, the method derives a default treating action effective to move the treating device through a default treating path.

18 Claims, 4 Drawing Sheets

(51) Int. Cl.
 *A01J 5/017* (2006.01)
 *B25J 9/16* (2006.01)
(52) U.S. Cl.
 CPC .......... *B25J 9/1664* (2013.01); *B25J 9/1697* (2013.01); *Y10S 901/09* (2013.01)
(58) Field of Classification Search
 USPC .............................. 119/14.18, 651, 665, 670
 See application file for complete search history.

(56) References Cited

U.S. PATENT DOCUMENTS

| | | | |
|---|---|---|---|
| 8,590,488 B2 * | 11/2013 | Hofman | A01J 7/04 119/670 |
| 9,554,552 B2 * | 1/2017 | Mellberg | A01J 7/04 |
| 2002/0006269 A1 | 1/2002 | Kageyama et al. | |
| 2006/0196432 A1 | 9/2006 | Peacock | |
| 2007/0101945 A1 | 5/2007 | Shumway | |
| 2011/0168096 A1 | 7/2011 | Nieswand et al. | |
| 2011/0245975 A1 | 10/2011 | Daubner et al. | |
| 2012/0048207 A1 | 3/2012 | Hofman et al. | |

FOREIGN PATENT DOCUMENTS

| | | |
|---|---|---|
| EP | 1 166 625 A1 | 1/2002 |
| EP | 1 520 468 B1 | 4/2005 |
| SU | 1777728 A1 | 11/1992 |
| WO | 98/08376 A1 | 3/1998 |
| WO | 02/07098 A1 | 1/2002 |
| WO | 02/07505 A1 | 1/2002 |
| WO | 2008/030086 A1 | 3/2008 |
| WO | 20101/012625 A2 | 2/2010 |

OTHER PUBLICATIONS

International Search Report, dated Jul. 8, 2014, from corresponding PCT application.
Supplementary International Search Report, dated Oct. 24, 2014, from corresponding PCT application.

* cited by examiner

TEAT TREATMENT METHOD AND APPARATUS

The present invention relates to an assembly comprising an apparatus for treating the teats of a dairy animal and more particularly to an assembly capable of conducting treatment of all teats of an animal within a limited time window. The assembly may advantageously be put into practice at dairy farming installations which include milking equipment and in particular, automated milking equipment. The invention may in particular be implemented before or after a milking operation. The invention may in particular be implemented at a rotary milking platform or at a stationary milking stall.

It has long been practised to treat teats of a milking animal after milking by using a so-called teat dip. One purpose for the dipping of teats is to prevent infection by applying some disinfectant fluid such as iodine solution or other disinfectant solution. Particular fluids may be used which have other or additional effects such as for example to create a barrier around the teat in order to prevent ingress of contaminants which may otherwise lead to infection. The barrier may in particular be effective for a period of time to allow the teats' milk passage openings to fully or partially close themselves. In some cases, teat dipping after milking may be accomplished by spraying fluid on the teats. It has also been practised to treat teats of a milking animal before milking by applying a cleaning medium which may also be a treatment medium, especially a treatment fluid. This practice of dipping, or spraying or otherwise applying a treatment fluid to an animal's teats before or after milking can be referred to as pre- or post-treatment and is described for example in US patent application publication number 2007/0101945, which relates to teat dipping or spraying. A post-treatment has also been suggested in association with automated milking using a milking robot as described in patent application EP-A-0536836, wherein a spray nozzle is disclosed mounted at the end of a robot arm which also handles teat cups or in EP-A-1166625, in which a gripper type robot arm may grasp and manipulate a teat spraying device or teat dipping device.

An automated system for applying disinfectant onto a cow's udder while the animal travels on a rotary milking platform is described in U.S. Pat. No. 6,443,094. Improvements in the automated delivery of treatment fluids to teats have been suggested in US patent application publication number 2011/245975 or 2006/196432 by using image analysis for teat location or udder location. In particular, it has been suggested to use a time-of-flight camera at a rotary milking platform for generating images of an animal's udder region, which, when analysed, permit movement of a robot arm towards an individual animal's identified udder location in order to perform a treatment to, on or at the udder or teats.

In most known systems for pre- or post-treatment of an animal's teats, a standard uniform fluid applying procedure is universally applied to all animals. In the context of automated milking, the need for rapid execution of various automated operations can be important from a range of perspectives, including cost efficiency, considering that automated milking installations represent a significant capital investment and require maximum throughput utilisation in order to keep costs below acceptable limits. Other reasons requiring rapid execution of operations include minimum interference on and intrusion upon animals, thereby preferably reducing the scope for an animal's obstructive or adverse response to an operation. In the context of rotary milking parlours, for example where an operation is performed on a moving animal from a fixed location at a platform periphery, it can be important that a particular operation is performed inside a limited time frame in order to avoid slowing down the platform. It may be noted in this context that a slowing of the platform for one animal necessarily causes a hold-up of the platform and an increase in dwell time for all animals present. Similarly, at a fixed stall equipped with automated milking equipment, it can be of importance to deduce to a minimum the amount of time each animal spends at the stall, especially when milking has been finished or before it commences. This allows a greater productive utilisation of the capital installation.

As already mentioned, systems have been proposed for making a determination of udder position or teat positions for individual animals at the time of carrying out a teat treatment operation in order to improve the effectiveness of the treatment, by ensuring a reliable, more accurate targeting of the treatment area. It may be speculated that the improved accuracy of such techniques may in some cases lead to a lower consumption of treatment fluid by avoiding the need to apply a treatment medium such as fluid blindly and wastefully over a larger area than needed in order to ensure the minimum desired coverage. Nevertheless, the implementation of teat treatment equipment which comprises sophisticated teat position detection equipment such as 3D imaging cameras and associated image processing means for targeted application of treatment fluid, has brought, along with its increased complexity, also an increase in the minimum time needed for carrying out the relevant operation. Where improved teat treatment is achieved in association with sophisticated teat detection and location equipment, time delays can occur if, for whatever reason, there is a delay in determining teat positions. In automated post-treatment, this can lead to a delay in an animal's release from a milking stall. In automated pre-treatment, this can lead to a delay in starting milking. In the context of a milking platform, this can lead to a delay for all animals and operations on the platform. In the context of a stationary milking stall, this leads to a delay in admitting subsequent animals, which may be waiting in a queue.

Therefore, in spite of various advances made in the treatment of teats, it is desirable to still further improve the efficiency of teat pre- or post-treatment in association with milking, possibly or preferably, in an automated milking installation.

Accordingly, the present invention provides a method and an apparatus as defined in the appended claims. A method according to the present invention is defined in appended claim 1. Further preferred features thereof are defined in appended subclaims 2-10. An apparatus according to the present inventions is defined in appended claim 11. Further preferred features thereof are defined in appended subclaims 12-15. Additional non-limiting features of the invention are explained herein.

According to the invention, there is provided a method and an apparatus for automatic teat treatment, for carrying out a pre- or post-treatment operation on the teats of an individual dairy animal. The method and apparatus may in particular be implemented in or in association with a stationary automated milking installation such as an automated milking parlour or a rotary milking platform with automated milking equipment. The method is performed using a pre- or post-treatment robot apparatus with a control system, which may in particular be a dedicated control system for the treatment apparatus or which may additionally comprise elements of a robot's own control system or which may be associated with elements of a robot's own control system. The control system of the treatment apparatus may in particular be connected to and exchange signals with a milking installation control system, whether of the stationary stall type or whether of the moving platform type.

The robot is capable of carrying a teat-treating device on an arm thereof and may additionally carry an imaging apparatus such as a camera preferably on a same arm. A teat treating device may be any applicator for applying a treatment medium such as a treatment fluid to teats. In some embodiments a teat dipping device or a teat spraying device may be used for treating the teats. Accordingly a dipping device such as a dipping cup or fluid brushing device may be used or one or more spray nozzles may be provided. In the proposed invention, animals having any number n of teats $z_1$ to $z_n$, may be treated. Common examples include animals with two or four teats. The method comprises the initial step of establishing a start time $t_0$ for said pre- or post-treatment operation. The time $t_0$ may in particular be determined following an input signal from an associated milking installation control system, indicating that milking has been completed and that a relevant animal may be post-treated. The time $t_0$ may alternatively be determined following an input signal from an associated milking installation control system, indicating that an animal has entered a stall prior to milking. Alternatively, the time $t_0$ may for example correspond to the movement of an animal stall of a moving platform to a starting position for the pre- or post-treatment operation: in particular, a signal may be generated setting the time $t_0$ when a rotary platform moves to a relevant angular position for initiation of a pre- or post-treatment operation at a stall on the platform. When the time $t_0$ is established, there begins a searching phase of the pre- or post-treatment apparatus in order to establish the presence of an animal at a pre- or post-treatment location. This step may be effected by detecting the physical presence of the animal using any appropriate sensor. An appropriate sensor may include a camera such as for example a 3D camera or so-called time-of-flight (TOF) camera. Accordingly, the pre- or post-treatment apparatus may comprise or may be associated with a detection device for detecting the presence of an animal, which device may be an image capture apparatus such as a camera, more specifically a 3D camera, preferably oriented towards the relevant treatment location. The image capture apparatus may additionally comprise or be associated with a suitable image processing system capable of analysing captured images such as images from an animal stall.

Once the presence of an animal at a treatment location has been established, there may be initiated an automatic detection of all the spatial teat positions of the animal of all n said teats $z_1$ to $z_n$ of a said individual animal at said treatment location. Preferably, this step may be carried out using imaging apparatus and image processing apparatus. By way of example, when using a TOF camera, the position of the camera in three dimensional space can be determined from a knowledge of the exact co-ordinates of the robot arm carrying the camera. The co-ordinates of the teats in three dimensions can be determined by means of camera image analysis combined with the determination of distance and angle of the portion of the camera image which is found to contain the images of teats. There may be a need for additional images to be made or for repeated image analysis before all the teats of an animal can be recognised in an image. The apparatus and method of the invention are intended to be able to make determinations of teat positions without relying on known physical data of individual animals such as stored animal data, in other words, the teat position determinations may be made using the image information and image analysis information alone, combined with the relevant camera co-ordinates. Stored data available to the system and method of the invention may be restricted to general data concerning e.g. the approximate dimensions of the particular animal type or approximate expected locations of certain body parts of the type of animal in question.

According to the method of the invention, if all said spatial positions of all n of the individual animal's teats have been detected before a subsequent time $t_d$ after said start time $t_0$ has been reached or has passed, then the method further includes:

(i) registering the spatial positions of all of the detected individual animal's teats and deriving, for example by means of a computation or calculation unit in the apparatus control system, a dedicated treating action for the treating device, effective to move it through a dedicated path defined by the registered spatial teat positions. In this context, the dedicated path is derived using the registered spatial teat position information in such a manner as to allow the treatment of each detected teat by virtue of the movement of the treating device along the dedicated path. Once the dedicated path is derived, the treating action on all n teats is initiated and carried out by movement of the treating device through the dedicated path. After carrying out the treating action, the pre- or post-treatment operation may be ended, preferably, by retraction of the deployed robot arm to its starting position, which may in some cases correspond to the position from which it detects the presence of an animal at a treatment location. The implementation of a dedicated treating path by a treating device allows the best possible accuracy in the treatment of each teat because each teat's position is taken into account during the movement of a treating device about the teats.

According to this step, the time $t_d$ may correspond to a latest point in time before which the process of detecting teat positions must be completed. This time may correspond to a time period stored within and imposed by the control system on the pre- or post-treatment method, in order to ensure that the pre- or post-treatment is not unduly prolonged, in order to ensure efficient treatment of an animal. For example, if the detection of some or all teat positions is for any reason proving unsuccessful during a pre- or post-treatment operation, the imposition of a point in time $t_d$ can ensure that the treatment process will nevertheless continue without excessive loss of time overall. In some embodiments, the predefined point in time $t_d$ may correspond to a predetermined angular rotational position of a platform. It is understood that where a pre- or post-treatment is carried out using a stationary treatment robot at a moving platform periphery, there may be only a limited time window available for normal completion of the treatment operation. In such a case, the point in time $t_d$ will be reached when the platform is at a rotational position after which a particular stall at a treatment location would remain within operational range of the robot for only enough time to allow a teat treating action to be carried out before the robot arm would need to be retracted, thereby ensuring progress of the relevant stall past the pre- or post-treatment location without hindrance or delay. In some embodiments, the last point in time before robot retraction from its deployed position must take place may be defined as $t_e$. In applications in which the method is implemented in association with a rotary platform. also $t_e$ may correspond to an angular position of a rotary platform, more specifically, to an angular position within a particular stall on the platform. In practice, the predefined point in time $t_d$ may advantageously be preselected and set such that, under non-disrupted operating conditions at a treatment location of the pre- or post-treatment apparatus and relevant milking installation equipment, the actual time elapsed between a starting point in time $t_0$ to the predefined time $t_d$ is approximately at least twice as long, preferably at least four times as long as the time required after a point in time $t_0$, for the pre- or post-treatment apparatus to identify all relevant spatial teat positions of an animal. This time period can be measured by observing the apparatus during normal uninterrupted operation and counting the time required from initiation of the operation at a point in time $t_0$ to the determination of all spatial positions of the teats of a relevant animal at the milking location. Alternatively, the point in time $t_d$ may be characterised as an early warning point in time selected and pre-set such that the time available between the point in time $t_d$ and the end time $t_e$ corresponds to the normal time required, during uninterrupted operation of the pre- or post-treatment apparatus, to derive a default treatment path and to carry out a default treating operation on all teats of an animal having been located at a pre- or post-treatment location. In this context, the point in time $t_e$ may in particular be the latest allowable point in time for the robot apparatus to retract away from a deployed operative position at the animal's udder. This point in time $t_e$ may for example be imposed by the normal operation of a rotating platform (i.e. it may correspond to a platform rotational position which a point in time $t_e$ would put the relevant animal stall which presents itself to a pre- or post-treatment apparatus, at an angle relative to the pre- or post-treatment robot apparatus such that there would be no further normal progress movement of the platform possible without creating or risking a collision between the deployed treatment robot arm and either parts of a platform stall or parts of an animal at the relevant stall). Alternatively, and possibly also in the context of a stationary milking stall, the point in time $t_e$ may for example be selected and pre-set in a control system of the apparatus to correspond to a latest permitted point in time after and defining a predetermined maximum allowed time for a pre- or post-treatment operation, beginning at the most recent time $t_0$.

Alternatively, if the given time $t_d$ is passed after at least one and before all spatial positions of all n of the individual animal's teats have been detected, then the method further comprises the steps of:

(ii) immediately halting any further detection of said spatial teat positions and registering the spatial position of each of those detected teats of said individual animal, and deriving, by means of said control system, an adapted treating action for said treating device and said individual animal, effective to move it through an adapted path defined by the registered spatial teat positions, the adapted path being additionally defined by approximated spatial locations in lieu of any undetected teat positions. The method furthermore involves carrying out the treating action of all teats by movement of the treating device through the adapted path and thereafter ending the pre- or post-treatment operation. This adapted path treatment allows the treatment to be completed to a best possible level of accuracy, given the lack of at least some of the teat position information which would be required for the dedicated path action. Nevertheless, this adapted path treatment ensures that the treatment is completed within a given time frame.

Still further alternatively, if the given time $t_d$ is passed before any of the spatial positions of all of the individual animal's teats has been detected, then the method further comprises the steps of (iii) immediately halting any further detection of said spatial teat positions and deriving a default treating action for said treating device and said individual animal, effective to move said treating device through a default treating path. The method further includes initiating and carrying out the treating action of all teats by movement of the treating device through the default treating path and thereafter ending the pre- or post-treatment operation.

The default treating path, while it offers a less accurate treating action than the dedicated or adapted paths, nevertheless ensures that the treating action is completed without disruption to the operation of a milking installation as a whole.

According to aspects of the invention, a treating action such as a default or adapted treating action shall commence after point in time $t_d$ is reached and before point in time $t_e$ is reached. If a signal indicating that point in time $t_e$ is reached is received by the treatment apparatus control system while the treatment robot is in a deployed position, then the robot is immediately retracted to its retracted, or starting, position. Preferably, the treating action is completed before a time $t_e$ is passed, wherein the time $t_e$ corresponds to a latest point in time until which the treating action may be permitted to continue. The time $t_e$ may thereby for example correspond to a point in time which is reached after a maximum allowed treating time has elapsed. A point in time $t_e$ may in particular be a point in time when a robot arm carrying a treating device must be retracted from its deployed position. In some embodiments, this point in time may be a predetermined point in time which sets out the maximum allowable time period before which a treatment action may be carried out. It may, depending on embodiments, define a maximum time period from a time $t_0$ or a maximum time from a time $t_d$ or a minimum time before a subsequent treatment operation is to begin. In embodiments in which a stationary treatment apparatus, i.e. an apparatus which is fixed to a floor or support location, is used in association with a rotating platform carrying animal stalls, the time $t_e$ may correspond to a time when retraction of a treatment arm is required in order to avoid a collision with an animal or with a neighbouring stall by virtue of the movement of the platform which may take a current animal stall out of range of the treatment apparatus. Thus, it may for example correspond to a point in time of a signal indicating that a moving animal platform has passed an angular position which defines the maximum extent of permitted robot end-effector travel during a pre- or post-treatment action. By way of example, a treatment robot may have a maximum reach, i.e. working range, which corresponds to the distance equivalent to 2.5 milking stalls. If a treatment arm is prevented from being retracted for any reason, after time $t_e$ is reached, then an emergency stop signal, halting a platform, may be generated. In other embodiments, e.g. in association with a stationary milking stall, there may be an alarm signal generated, as may be customary, when required robot movements are not able to be carried out for any reason.

In some embodiments, an additional point in time may be prescribed after time $t_0$ and before a teat-treating operation is initiated. A time $t_s$ may be specified as a point in time which marks the expiry of a permitted searching period in instances where no animal has been found, or where a body part of the animal which would allow a robot arm end effector to be guided to an operative position, cannot be located. For example, a robot movement guidance system within the control system of a teat treatment apparatus may rely upon identifying the spatial position of a leg or an udder (or both) of a relevant animal at a pre- or post-treatment location in order to determine whether there is enough space to enable movement of a robot arm to an operative position underneath its udder. If there is found to be enough space allowing robot access to an operative position, then the robot arm end effector (i.e. the treating device) may move along an approach path to the required location. In some embodiments, a guidance system may for example search for two legs or two legs and an udder in order to determine the available space and to allow a robot arm end effector to be brought into its operative position. In alternative embodiments, an end effector such as a treating device may be moved to an animal's udder from a position to the side of the animal, necessitating an entry window to be determined on the basis of detecting an animal's nearest hind leg and its udder, possibly as well as portions of its side- or underbody. The space requirement allowing access, e.g. in the form of an approach path, to an operative position beneath an animal's udder may be referred to as a "window" and may typically be determined using image-analysis. Hence, the point in time $t_s$ may be used to define the end of the permitted search period, irrespective of which necessary search steps are to be performed in respective embodiments. In a stationary milking stall, the permitted search time may be set to expire at time $t_s$ in order to terminate an unsuccessful search operation without causing undue delay. In embodiments in which a treatment apparatus is associated with a moving animal platform, the search time $t_s$ may correspond to an angular position of a platform and/or of a relevant stall on the platform which, after it has passed by a certain position in relation to the treatment apparatus, would no longer allow enough time, at normal platform rotation speed, to permit subsequent robot deployment to an operative position, teat position identification and a treating action to be performed before the platform would have passed its treatment location nearby the treatment apparatus.

In embodiments in which a treatment apparatus is associated with a stationary milking stall or treatment stall, a so-called entry window allowing deployment of a robot arm to its desired operative position may be determined by detecting relevant body parts of an animal at a treatment location. If no suitable entry window is determined, then the apparatus my re-initiate a search procedure to find an entry window for as long as a point in time $t_s$ for ending searching operations has not been passed. If a sufficient entry window has been identified, then the robot arm may be moved to a relevant identified operating position. In embodiments in which a stationary treatment apparatus is associated with a moving platform, the process of determining an entry window may include identifying body parts of an animal at an early stage of a searching phase, and subsequently pausing until an animal is brought, by movement of the platform, into a position allowing movement of the robot arm to its desired operating position.

Whilst an additional point in time $t_s$ has been discussed above as an optional aspect of the present invention, it will be understood that, in any case if at any time during the stages after a most recent point in time $t_0$ and preceding or during teat position detection, a point in time $t_d$ is exceeded, then the current method step may be interrupted and either—if possible—a default or adapted teat treating may be carried out as per step (ii) or (iii) above or the method may be aborted.

In aspects of the invention, the step of searching for an animal at a pre- or post-treatment location may, after determination of the presence of an animal, be followed by determining a spatial reference point in relation to the animal. This may precede or it may follow the determination of a so-called entry window to an operational position or, a determination of a reference position may be carried out independently of any determination of an entry window. In some embodiments, it may be appropriate to determine a reference location at an operative position of a robot end effector (which may be a treating device). A reference location, in this context may be a reference point in space in relation to which the spatial teat positions are defined and/or it may be a starting position for a pre- or post-treatment treating action. A suitable reference point may be a reference location from which spatial teat positions may be detected using optical detection means such as a camera, 3D camera or TOF camera. The determination of a reference point may be made following an analysis of images of an animal's expected udder region preferably obtained by an image capture device and possibly at an early stage of a pre- or post-treatment operation immediately following a determination of the presence of an animal at a pre- or post-treatment location (sometimes referred to as a treatment location). A suitable reference location may be in particular defined in terms of a co-ordinate system at a treatment location, that is to say, it may be defined in relation to a treatment location, even while it may be selected to lie proximate an animal's udder. In some embodiments a default treating path may be defined in relation to a previously determined reference point R in relation to the pre- or post-treatment location or in relation to the determined position of an animal present at that location, in particular, having regard to the determined position (if any) of the animal's udder and possibly one or more of its legs. Hence, the initiation of the automatic detection of all the spatial teat positions, may be conducted from a reference location R. The individual teat positions may be defined either in relation to the reference location R or in relation the relevant treatment location. One effect of the determination of the reference location R, in the context of a milking platform, may be to move the robot arm end effector, with an imaging device through a relevant window to a position R where it is positioned in fixed relation to the treatment location, i.e. in relation to the platform, or more specifically in relation to a relevant stall. The robot arm will thereafter be controlled in such a manner as to maintain its end effector portion in the reference location: this may be achieved by precisely co-ordinating the movement of the robot with that of the platform, including stopping the movement of the robot arm end effector in case the platform stops, perhaps momentarily, for any reason. Accordingly, in some embodiments, an operational reference point may be determined in the vicinity of the animal at a treatment location. The reference point may be any suitable reference position nearby the animal and may for example be a reference location in relation to the animal's udder and/or legs; it may in particular be a starting position for e.g. a pre- or post-treatment spraying or dipping action and may preferably be determined using said imaging apparatus and image processing apparatus. Distances and movement actions to respective teats may be determined in relation to said reference point. In some embodiments, a reference point may be a standard reference location or datum for the treatment location. In embodiments, the teat position reference point may be at a central position between the animal's legs, i.e. in a central plane passing between the animal's respective pairs of legs, and at a height between the respective udder and floor heights. Alternatively, the method may include the steps of detecting the spatial position of a portion of the animal's side- or underbody and one or more of its legs and its udder and deriving therefrom a said reference point R. In this context, the udder height may be taken as either the lowest point of an udder, not including teats, or lowest point of udder including all its teats. In case no opportunity can be found to move a robot arm through an identified entry window to a deployed position under an animal's udder before a point in time $t_s$ is passed denoting the compulsory end time of search procedures, then the method of the invention may be abandoned.

In some aspects of the invention, a stall on a platform may constitute a treatment location when it is accessible for working purposes by a stationary treatment robot at the platform periphery, i.e. the stall may be "in working range" of the robot.

In the present context, a pre- or post-treatment apparatus may comprise a robot having an arm which may be moved from a retracted position in which a sensor seeks to detect an animal's presence, to a deployed position from which the teat positions are detected or from which a teat-treating action is carried out.

Preferably, the method and apparatus of the invention allow accurate treatment of an animal's teats. In some embodiments, the invention allows accurate spray application of treatment fluid on each teat or accurate dipping of each teat. Moreover the treatment can be applied swiftly and is adapted to each individual animal to be treated. Furthermore the method and apparatus are adapted to any position of an animal which is present for treatment. Still further, the method and apparatus allow to avoid using excessive treatment fluid, by targeting the individual teats. In addition, the method and apparatus allow a reliably swift execution of a teat treatment by ensuring that the treatment is completed within a required time window. In some embodiments, the time window can be flexibly determined, for example when used in conjunction with a moving milking platform such as a rotary platform, the time window can be determined by the animal's presence at a treatment location nearby a pre- or post-treatment robot. In preferred embodiments, the pre- or post-treatment apparatus, may be modular and autonomous, that is to say, it may be stand-alone and may be capable of operating at and in combination with a variety of different automated milking installations.

In particular, according to the invention, the control system may be the robot's own control system or a control system of the installation or other suitable control system which in any case, is associated with said image processing system. The imaging apparatus may in particular be an image gathering device such as a camera in particular a 3D camera or time-of-flight camera known per se in the art. The imaging device may in particular be mounted, e.g. fixedly mounted, on an arm of the robot. In embodiments, one or more spray nozzles may be mounted on an arm of the robot.

In embodiments, the start time $t_0$ may be set by the control system when a trigger impulse is received in the control system indicating that a pre- or post-treatment is required to be performed. To this end, the pre- or post-treatment apparatus may be connected to an external sensor or signal generator, possibly in association with a milking apparatus such as an automated milking stall of a milking platform. In embodiments in which a pre- or post-treatment apparatus is associated with a moving platform, a signal generator providing input signals to the treatment apparatus control system may be associated with a movement sensor arranged to sense movements of the platform. Signals transmitted to the control system of the pre- or post-treatment apparatus may in particular represent the platform's incremental or progressive movement and may serve to indicate the platform's current rotational position. The information may allow the exact rotational, angular position of each animal stall on the platform to be determined at any given moment in time. It will be understood that points in time, such as $t_0$ or $t_d$ or $t_s$ or $t_e$ may not always be separated by a constant time period when those points in time relate to respective platform or stall rotational positions because if a platform is momentarily paused between any two defined points in time, then the time between those defined points in time may vary. This applies in the context of a rotary platform although not necessarily in the context of a stationary stall. In effect, where points in time ($t_0$ etc.) are defined by platform angular rotational positions, then the time elapsed between the passage of the various angular positions corresponding to those points in time is determined by platform speed.

In an embodiment of the invention, approximated spatial locations in lieu of any undetected teat positions may be computed by the control system at or immediately after time $t_d$ is passed. This ensures that the treatment method continues without delay even in situations in which the system has been unable to determine all the teat position data. This allows a default path or adapted path to be implemented without delay.

In a further feature, the approximated spatial locations in lieu of any undetected teat positions may be computed by estimating the position of any and all undetected teats using data comprising the detected spatial positions of the detected teats. In particular, basic, general, non-individual data held in a memory of the apparatus control system may comprise an algorithm for detecting remaining teat positions on the basis of detected teat positions. There may be a specific algorithm to be implemented depending on which one or more teat positions have been confirmed to have been detected.

In a further feature, approximated spatial locations in lieu of any undetected teat positions may be determined by normalising acquired spatial position data from an imaging apparatus and using look-up tables comprising normalised teat position data stored in a memory associated with a control system. Accordingly, the determined spatial position of one or more particular teats may correspond to presumed positions of any unidentified teat positions as set out in look up data tables.

According to a further feature, an approximated spatial location in lieu of a said undetected teat position may be derived by assigning said undetected teat to a position corresponding to a mirror image position of its detected opposite teat. In this context, the term "opposite teat" may mean, for a front left teat: the front right teat or vice-versa, and for a rear left teat: the rear right teat or vice-versa. The mirror plane may in particular be a virtual plane dividing the left and right halves of the animal and may be computed by the image processing apparatus and/or by a control system or other sensor. Additionally, there may be derived, from the detected spatial positions of the legs, a central plane bisecting the space between said legs; and there may be derived, from a detection of the spatial position of the animal's udder, the udder height, e.g. it's height from the floor and/or the distance of the udder away from the imaging apparatus.

Still further optionally, the determining of a spatial reference point R in relation to an animal at a treatment location may be carried out prior to the step of initiating automatic detection of the spatial teat positions.

According to the invention, it is not envisaged to use data relating to individual animal physiology, provided that some general information relating to the relevant species or breed may be stored and used as reference information e.g. for assisting in finding unidentified teat positions.

As mentioned, the present invention also encompasses a teat-treatment apparatus for carrying out a pre- or post-treatment operation on the teats of an individual dairy animal. In particular, the pre- or post-treatment apparatus of the invention is configured to carry out the method which is defined and may be additionally configured to carry out additional optional embodiments as defined or described.

According to the apparatus of the invention, there may be provided a device for detecting the passage of successive animal stalls on a nearby rotary platform. The device may in particular comprise an encoder for monitoring platform position at any given time or on an ongoing basis. The encoder may transmit its output signals relating to platform position to the control system of the teat treatment apparatus. In some embodiments, the encoder may be associated with data comprising platform features at respective platform angles, thereby allowing the encoder to transmit platform feature information to the treatment apparatus control system as the platform moves progressively. Alternatively, the teat treatment apparatus control system may be capable of converting platform angular position signals from the encoder into relevant platform features.

In aspects of the invention, the robot of the teat-treatment apparatus may be "stand-alone", that is to say, it may be supplied independently of a rotary platform or automatic milking stall or other milking installation element. The robot may in particular comprise any suitable means for detecting the passage of successive platform stalls or the presence of an animal at a stall. The robot may in particular comprise an autonomous control system independent of an overall installation control system or database. The autonomous robot control system may in particular be capable of synchronising a part of the robot with a moving platform, thereby allowing the apparatus control system to operate the robot, and in particular a robot arm end-effector or treating device, as if the moving platform were a fixed environment. In general, the control system of the robot apparatus may not have access to animal identification data or other individual animal data.

According to aspects of the invention, imaging apparatus may either be provided integrally fixed on a robot arm it may be capable of being firmly grasped by a robot arm actuator.

According to further aspects of the invention, a time $t_d$ may be selected by a user and input into a robot control system and may correspond to an envisaged maximum time or platform angular movement after time $t_0$ has passed. Consequently, time $t_d$ may define a maximum available time for locating an animal and determining teat positions. According to further aspects of the invention, a time $t_s$ may be selected by a user and input into a robot control system and may correspond to an envisaged maximum time or platform angular movement after time $t_0$ has passed. Consequently, time $t_s$ may define a maximum available time for locating an animal and determining an entry window to a position nearby an animal's udder. The term "rotary platform" may include belt type moving platforms bearing stalls or it may include any conventional rotary platforms. In case no animal is detected, no treatment may be performed. In case no reference point can be derived from which to conduct teat detection or pre- or post-treating, an alarm signal may be sounded.

Implementation of the present invention leads to reduced consumption of treatment fluid while preventing delays to the automated milking process as a whole.

Implementation of the present invention leads to reduced delays to the milking process as a whole, while lowering the consumption of treatment fluid.

Additional aspects of the invention will be described with reference to illustrations which show non-limiting examples of certain features and embodiments.

Figure 2:
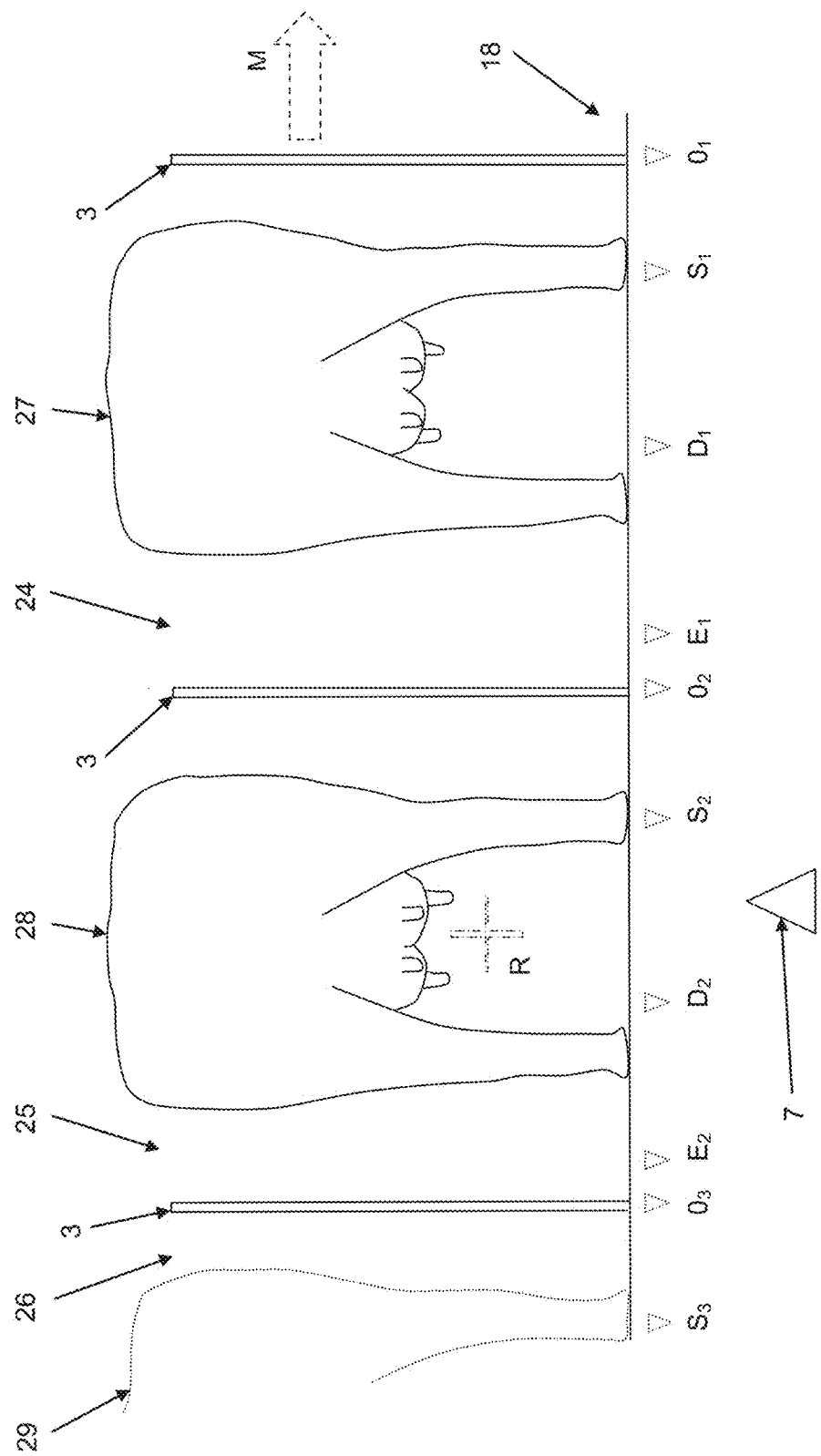
Figure 3:
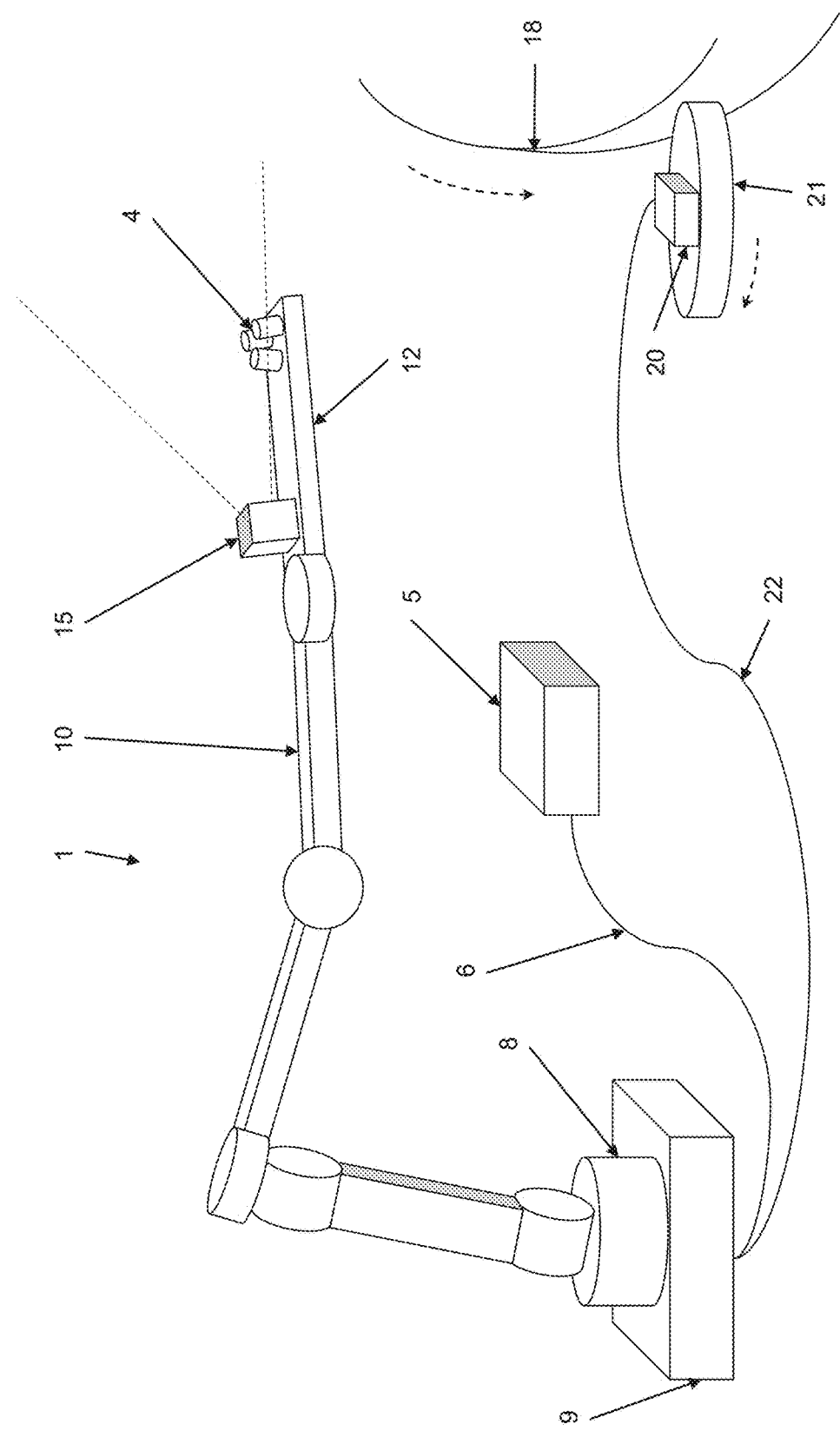
Figure 4:
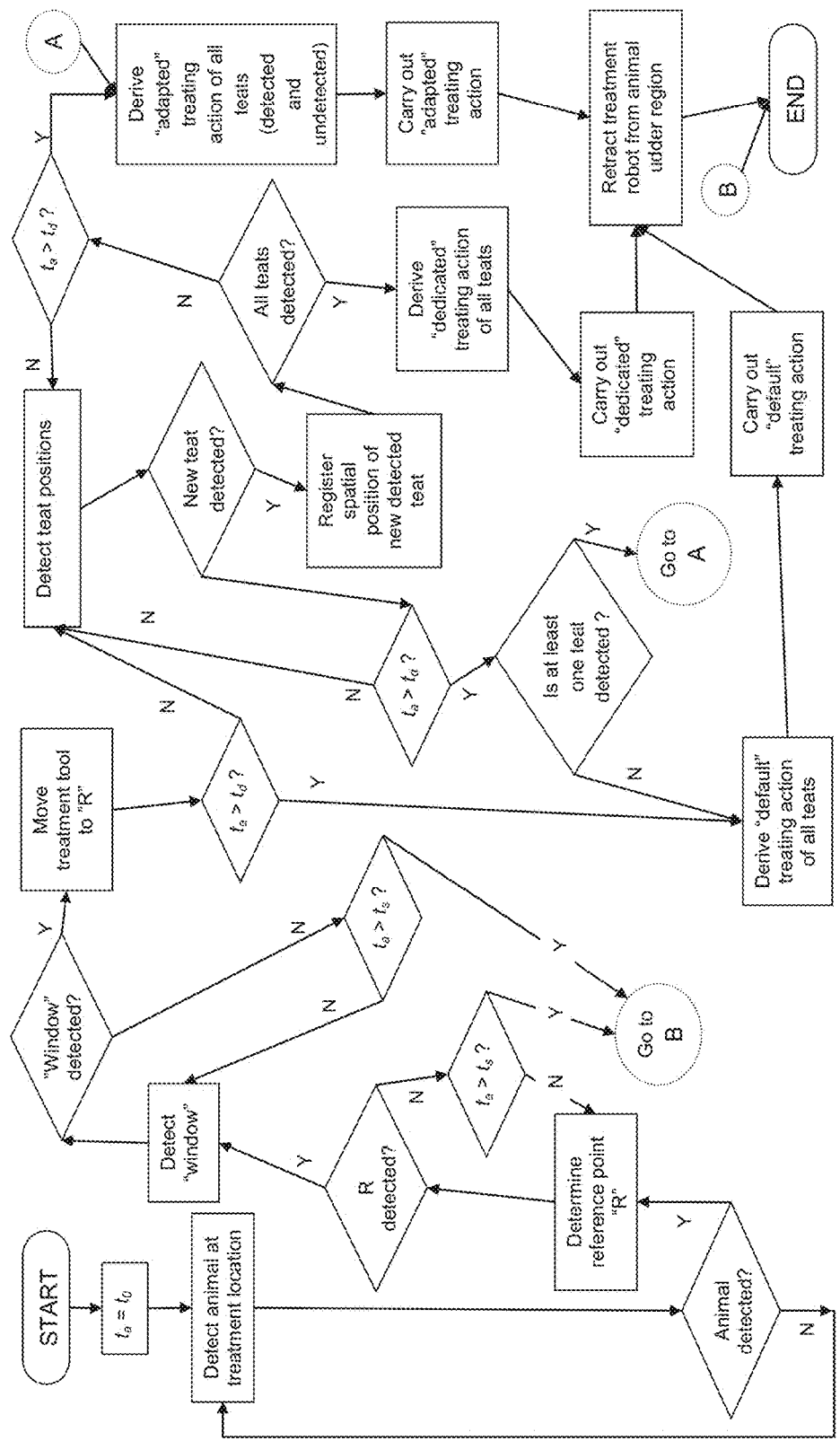

FIG. 1 shows a flowchart setting out some method steps according to one implementation of the invention FIG. 2 shows a schematic illustration of a view of a moving animal platform for illustrating a possible implementation of the invention FIG. 3 shows a schematic illustration of a robot capable of implementing aspects of the present invention FIG. 4 shows a flowchart setting out some method steps according to a further possible implementation of the invention In FIG. 3, there is shown, schematically, a rotary platform 18 although the invention is not limited to embodiments at a platform and may include embodiments at a conventional fixed milking stall (not shown). The platform is shown in the present example for illustrative purposes only. A teat-treatment apparatus 1 is shown schematically by way of example in the form of an articulated robot having a fixed, stationary base 9 and movable arms 10. The basic robot construction may be of a known type and may comprise its own movement control system module 8. Associated with the robot is a control system 5 for the teat treatment apparatus and connected by a cable 6 or wirelessly to the robot. This control system 5 may be directly or indirectly associated with other control elements such as milking installation control elements (not shown) or sensors such as a platform movement sensor, illustrated in FIG. 3 in the form of an encoder 20 associated with an encoder wheel 21. Also the encoder is connected to the robot or to the control system 5 by means of a cable 22 or other wireless connector. Other sensors may be provided such as other physical sensors for detecting animal stalls or animals at the vicinity of the platform 18. The direction of movement of the encoder wheel 21 and of the platform 18 are indicated by dotted arrows in FIG. 3. The working area of the robot (i.e. its working range) may encompass an area corresponding to a sector of the platform 18 in the robot's vicinity, which may be considered to be a pre- or post-treatment location for the purposes of the present disclosure and which may by way of example extend across the size equivalent to approximately 2.5 milking stalls. Towards an extremity of the robot arm, there may be provided an end-effector shown in FIG. 3 schematically as a teat treating device 12 having an image capture device 15 and a treatment fluid applicator 4, which may be one or more spray nozzles, or a dipping cup or another type of treatment medium applicator such as a brush or set of brushes. As can be inferred from the illustration of FIG. 3, the encoder provides an ongoing means of reference for the control system 5 as to the rotational movement speed and distance of the platform and allows a determination to be made of the platform's angular position at any time. This also allows the control system to determine the exact location of each of the stalls on the platform 18 at any time and it further allows the control system 5 to determine which, if any, stall is momentarily at the robot's treatment location, i.e. within working range of the robot. The robot in FIG. 3 is shown in a partially deployed position, between a retracted [starting] position and a fully deployed, operational position in which the end effector would be above the platform 18 in the vicinity of an animal's udder.

In FIG. 2 there is illustrated a partial schematic view of a platform 18 as seen from its periphery nearby a position 7 of a treatment apparatus 1. Three animal stalls 24, 25 and 26 are visible in the partial view, each separated by a respective bail 3 and each occupied by an animal 27, 28 or 29. Also shown is a series of points $O_1$, $O_2$, $O_3$ corresponding to successive points in time $t_0$ as the platform 18 moves them past the robot position 7; a series of points $S_1$, $S_2$, $S_3$ corresponding to successive points in time $t_s$; a series of points $D_1$, $D_2$, $D_3$ corresponding to successive points in time $t_d$; a series of points $E_1$, $E_2$, $E_3$ corresponding to successive points in time $t_e$ etc. A reference location R is indicated under the udder of animal 28 which occupies stall 25. The positions $O_1$, $O_2$, $O_3$ may not be visible on the platform 18 although they will be reference positions corresponding to particular platform periphery locations which will be registered by the apparatus control system 5 as the platform moves past the robot location 7. The direction of movement of the platform is indicated by the arrow M. From the approximate positions of the markings $O_1$, $O_2$, $O_3$, $E_1$, $E_2$, $E_3$ etc, as indicated in FIG. 2, it can be seen that if the platform moves at a more or less constant speed, then the minimum time available for the treating action corresponds to the time taken to move a relevant stall 24, 25, 26 through the distance between $D_1$ and $E_1$ (or $D_2$ and $E_2$ etc.) past a robot position 7.

The flowchart in FIG. 1 shows an illustrative method sequence according to the present invention. A discussion of the flowchart will be given in the context of the illustrations at FIGS. 2 and 3. When an encoder 20 generates a movement signal which leads to a position determination either in the encoder 20 itself or in the control system 5 indicating that a platform is in an angular position which brings a milking stall 24, 25 or 26 to a starting position for a treatment, then a $t_0$ signal is generated within the control system 5. Then actual time (current time) $t_a$ is considered to be a starting time $t_0$. This point in time may in particular coincide with a leading bail 3, as seen in the direction of platform movement, reaching a position at the working vicinity of the treatment apparatus 1 shown by way of example at position 7 in FIG. 2. At this point, the imaging apparatus 15 which may be a TOF camera or other 3D camera, would, from its retracted position 7 of the robot, be actively gathering image information for analysis by an associated image processor. From the information, a determination is made as to whether or not an animal 27, 28, 29 is present at a relevant stall in the vicinity of the robot (i.e. at a treatment location). As an alternative, according to the invention, any suitable known sensor device may be employed for ascertaining an animal's presence after time $t_0$ is recognised by the control system 5. If an animal is found, the control system 5 makes a determination of the animal's position using any relevant information from the sensors which are used. Provided a point in time $t_d$ has not been exceeded, the end effector 12 of the robot arm, carrying a treating device 4 is then moved to a working position in the vicinity of the animal's udder from which position additional visual information is gathered in the form of image information using imaging device 15, allowing for a determination of the spatial positions of the animal's teats, by means of associated image processing means. When all teat positions have been determined, and provided the latest point in time $t_d$ for a completed detection phase has not passed, then a dedicated treatment action is derived which action takes into account all the detected teat positions and is then carried out. Accordingly, the end effector 12 is moved though a treatment path allowing the treating device 4 to treat each one of the teats before the robot arm is retracted to its starting position. Although not illustrated in the flowchart, in case an end time point $t_e$ is reached before the treating action is completed, then it is interrupted and the robot is moved to its starting position out of the way of the animal 27, 28 or 29 and the stall 24, 25 or 26 which are being moved along by the platform. It may be noted that in the context of a moving platform 18, the time available between various points in time $t_0$, $t_d$ etc. may vary, depending on the speed of progress of the platform.

It should be noted that the robot control system 8 may ensure that during image gathering operations by the imaging device 15, when in an operational deployed position in the vicinity of an animal's udder, the end effector 12 is moved along in synchronisation with the platform. Thus, the end effector 12, during its image gathering operation, is effectively motionless in relation to the platform stall.

As can be seen from the flowchart in FIG. 1, if, during a detection phase in which udder images are gathered, from a deployed position of the robot arm end effector 12, and analysed, the point in time $t_d$ is reached (i.e. actual time $t_a$ equals or is after $t_d$) before all four teat positions are detected but after at least one teat position is found, then the teat position determination operation is interrupted. Instead of searching for, detecting and recording/registering the remaining undetected teat positions, an adapted treating action is derived on the basis of that or those teat position/s which has/have been detected and on the basis of the best estimate by the control system of where the undetected teats are likely to be, i.e. on the basis of one or more approximated teat positions. Again, provided the point in time $t_d$ is not exceeded, then the adapted treating action is carried out, treating all teats, before the robot arm is retracted to its starting position. Approximated positions are used for remaining unknown teat positions and these may be derived in a number of ways, in particular, using information from detected teats and knowing that teats are generally arranged in a regular or more or less predictable arrangement depending on the animal species or breed in question.

If, during a detection phase in which udder images are gathered, from a deployed position of the robot arm end effector 12, and analysed, the point in time $t_d$ is reached before any teat position is detected, then the teat position determination operation is interrupted. Instead of detecting the undetected teat positions, a default treating action is derived on the basis of estimated positions of all four teats. This may be carried out using basic data gained from the location of an animal's udder or from an approximate determination of the animal's position. Provided the point in time $t_d$ is not exceeded, then the default treating action is carried out, treating all teats, before the robot arm is retracted to its starting position. Approximated positions are used for unknown teat positions and these may be derived in a number of ways, in particular, using information from a detected user position or from detected position information of any other body parts of the animal in question. Teats are generally arranged in a regular or more or less predictable arrangement in respect of the animal species or breed in question.

It will be understood that the most efficient and effective treating action is the dedicated treating action, while the adapted treating action offers the best possible treatment in case at least one, but not all teat positions are detected. The default treating action is likely to take longest and to use most treatment medium such as treatment fluid. Nevertheless, the default and adapted treating actions provide backup treating actions which are likely to be required only in a minority of instances. An advantage of the present invention is that generally speaking, a dedicated treating action can be implemented, saving on treating medium and ensuring an excellent treatment. In case the dedicated action cannot be performed, then instead of there being no treatment or a robot error, possibly stopping further progress of a platform or further operations at a stationary milking stall, the adapted treating action is implemented offering almost all the advantages of the dedicated action, or, a default action is implemented, at least ensuring that the relevant animal is treated and avoiding interrupting production.

In FIG. 4, there is illustrated a flowchart of a method including some optional aspects of the invention. After detection of an animal at a treatment location, a determination of a reference location R is made, nearby the udder of the relevant animal. As discussed previously in this disclosure, the reference location R corresponds to a co-ordinate position in relation to the treatment location which puts the end effector 12 in the operational vicinity of the animal's udder for the purpose of both image gathering for teat position detection and to the purpose of providing a starting position for the treating action of the treating device 4 of the end effector (i.e. the treating device of the treatment apparatus 1). After the location R is detected, the imaging device 15 and its associated image processor attempt to determine a so-called entry window to the reference location R by calculating the space available around a path between the robot 7 and the reference location R. If there is calculated to be enough space to allow passage of the end effector 12 to the reference location R without contacting the animal, and provided time $t_s$, the latest point in time for completion of searching is not passed, then the robot is controlled to move the end effector 12 to that location R for the next stages of the method, as previously described, to take place. A robot arm end effector 12 may be held at position R, effectively motionless in relation to a moving platform stall, while the platform continues to move.

In some embodiments, the reference position R may be determined after a determination of access via an entry "window" has been made. In still further embodiments, an additional step (not represented) of analysing image information to assess whether a milking cluster is or is not attached to the animal's udder may be carried out. If a cluster is determined to be attached to the animal's udder, then in particular, no pre- or post-treatment may be carried out. The animal in question might travel around the rotary platform (or "rotary") once again. In such a case, also no further pre-treatment would be carried out at a pre-treatment location owing to a cluster being detected on the animal's teats also at a pre-treatment location. A further example of specific and optional aspects of the operation of a method and apparatus according to the invention may be as follows:

The teat treating system may be controlled by a number of interacting programs. One optional spray operation may include some or all of the following steps:

1. A robot manager program monitors the rotary platform movement. At one specified location per stall, a robot manager program of the treatment apparatus may send a start command to a robot controller program.

2. A robot controller program uses the information from a vision sensor (TOF camera) to determine whether an animal is present in the stall, whether a milking cluster is detached, and whether there is enough room for the robot arm to enter between the rear legs of the animal or—as the case may be—from the animal's side.

3. If an animal is present and other conditions are fulfilled, the robot may wait until the cow is directly in front of the robot at position 7. If not, operation may be aborted and a robot controller program may wait for the next start command (the next stall) indicating another point in time $t_0$.

4. When the animal is in front of the robot opposite position 7, the robot starts following the rotary platform movement, enters—possibly between the rear legs, or from the side—and uses the vision sensor to identify the teats. The position to where the robot enters is determined by the location of the udder. If the rotary starts reversing, the robot follows, keeping in the same position relative the moving platform.

5. After identifying the at least some or all of the teat positions, a treatment path is derived and the robot moves to the relevant determined or calculated teat positions one by one and sprays them individually, in accordance with a dedicated, adapted or default treatment path.

6. After all teats are sprayed, the robot exits from underneath the cow, moving out from the rotating platform. The robot returns to the start position and may wait for the next start command from the robot manager program.

There may also be a stop command sent at time $t_e$ by a robot manager program to abort all operations if the robot is still under the cow and is approaching the physical limit of its working range. If the robot by some reason is unable to complete the exit action in time, the platform may be stopped by triggering an emergency stop.

The platform motion may be measured and monitored with a standard encoder, possibly mounted on the inside or outside of the rotary platform in line with the working range (or working area) for the robot and relayed to the control system 5 of the treatment apparatus 1. The robot may in some embodiments use a separate encoder connected directly to a robot controller 8. Optionally, both encoders may be mounted on the same encoder wheel axis.

Next to the platform encoder 20, there may be provided a synchronization sensor which is triggered once per revolution. The synchronization signal may ensure that the apparatus control 5 system at every moment knows which stall is in front of the robot, and also exactly the relation between the robot and platform coordinate systems.

The vision guided robot motion may be divided into two subtasks; (i) locate animal and udder, and (ii) find individual teats. This image processing may operate on one set of images at a time, each set from one time sample. The identification and decision making using information from also previous time samples may be performed by robot controller program.

According to embodiments of the invention, the pre- or post-treatment apparatus may comprise a spray robot, having a treating device 4 in the form of one or more spray nozzles. The robot may be based on a standard 6-axis industrial robot mounted to the floor on the outside of a parallel type rotary platform. Modifications from a standard industrial robot may mainly consist of coating/sealing certain moving parts and interlaces as well as a communication interface and end-effector 12. The end effector may have a TOF camera pointing towards the centre of the rotary. The camera (and associated image processor) is used for identifying cow presence in the stall, it may additionally check for presence of a cluster or no cluster on an udder of a detected animal. If there is no cluster found, the camera and image processor may find a suitable opening between rear legs or under the animal from a side position and later finding the teats to be treated. Camera cleaning may be built in the end effector and may be performed automatically by a cycle of water and air sprayed at a camera housing viewing glass shield.

The end effector may in particular have three spray nozzles pointing upwards, to ensure enough spray capacity to coat the relevant teat and also to create a drip on the teat tip, while ensuring adequate coverage of the teat target area. The system may be controlled by a touch-screen graphical user interface placed outside the robot cell and allowing interactive control by an operator. A display screen may for example present the current status of the system and the success/failure of treatment operations.

Embodiments illustrated and described herein are non-limiting. Further and equivalent features within the scope of the claims will be apparent to one skilled in the art.

The invention claimed is:

1. An automatic teat treatment method for carrying out a treatment operation on the teats of an individual animal, said method being performed using a robot apparatus with a control system and an arm, the arm of the robot being configured to carry a teat treating device, said method comprising the steps of:
   using the control system, automatically establishing a start time t0 for said treatment operation;
   establishing a presence of an animal at a treatment location;
   using the robot, initiating automatic detection of spatial teat positions of all said teats of said individual animal at said treatment location;
   (i) when all said spatial positions of all said teats have been detected before a predefined time td after said start time t0 has passed, then registering the spatial positions of all of the detected teats before said predefined time td has passed, and deriving, by using of said control system, a dedicated treating action for said treating device, effective to move said treating device through a dedicated path defined by said registered spatial teat positions of said individual animal, and initiating and carrying out said dedicated treating action of all said teats by movement of said treating device through said dedicated path and thereafter ending said treatment operation;
   (ii) when said predefined time td has passed after at least one said spatial positions and before all said spatial positions of all the teats have been detected, then immediately halting any further detection of said spatial teat positions and registering the spatial position of each detected teat, and deriving, by using said control system, an adapted treating action for said teat treating device and said individual animal, effective to move said treating device through an adapted path defined by said registered spatial teat positions, said adapted path being additionally defined, for undetected teat positions, by approximated spatial locations, and initiating and carrying out said adapted treating action of all said teats by movement of said treating device through said adapted path and thereafter ending said treatment operation; and
   (iii) when said predefined time td has passed before any said spatial position of the teats has been detected, then immediately halting any further detection of said spatial teat positions and deriving a default treating action for said treating device and said individual animal, effective to move said treating device through a default treating path, and initiating and carrying out said default treating action of all said teats by movement of said treating device through said default treating path and thereafter ending said treatment operation,
   wherein said robot apparatus is a pre-treatment robot apparatus or a post-treatment robot apparatus, said treatment operation is a pre-treatment operation or a post-treatment operation, and said treatment location is a pre-treatment location or a post-treatment location.

2. The automatic teat-treatment method according to claim 1, wherein said approximated spatial locations are computed by said control system at or immediately after said predefined time td is passed.

3. The automatic teat-treatment method according to claim 1, wherein said approximated spatial locations are computed by estimating a respective position of all undetected teats using data comprising the detected spatial positions of the detected teats.

4. The automatic teat-treatment method according to any claim 1, wherein said approximated spatial locations are determined by normalizing acquired spatial position data from an imaging apparatus and using look-up tables comprising normalized teat position data stored in a memory associated with said control system.

5. The automatic teat-treatment method according to any claim 1, wherein, for one said undetected teat, said approximated spatial location is derived by assigning said one undetected teat to a position corresponding to a mirror image position of an opposite teat.

6. The automatic teat treatment method according to claim 1, wherein said method further includes, prior to said step of initiating automatic detection of said spatial teat positions, a further step of determining a spatial reference point R in relation to said animal at said treatment location.

7. The automatic teat-treatment method according to claim 6, wherein said step of determining a spatial reference point R in relation to said animal at said treatment location further includes the steps of detecting, using an imaging apparatus and an image processing apparatus, a spatial position of at least one hind leg of the animal and of an udder of the animal and deriving therefrom said reference point R.

8. The automatic teat-treatment method according to claim 6, further comprising moving said imaging apparatus to said reference point R.

9. The automatic teat-treatment method according to claim 1, wherein said spatial positions of said teats are detected, derived, or approximated without reference to historic data for the individual animal.

10. The automatic teat-treatment method according to any claim 1, wherein said method is carried out using said robot apparatus in association with a rotary platform.

11. The automatic teat treatment method according to claim 1, wherein said robot apparatus is a pre-treatment robot apparatus, said treatment operation is a pre-treatment operation, and said treatment location is a pre-treatment location.

12. The automatic teat treatment method according to claim 1, wherein said robot apparatus is a post-treatment robot apparatus, said treatment operation is a post-treatment operation, and said treatment location is a post-treatment location.

13. An automatic teat treatment apparatus for carrying out a treatment operation on teats of an individual animal having plural teats, said apparatus comprising:
- a robot with a robot arm and an associated control system, said robot arm configured for carrying a teat-treating device;
- an imaging apparatus; and
- an image processing apparatus, wherein,
- said control system, in operation, automatically establishes a start time t0 for said treatment operation, and establishes a presence of the animal at a treatment location, and controls the steps of:
- said imaging apparatus and said image processing apparatus initiating automatic detection of spatial teat positions of all said teats of said animal at said treatment location;
- determining, during said detection of said spatial teat positions, whether a predefined time td after said start time t0 has passed, and wherein
  - (i) when all said spatial positions of all said teats have been detected before a predefined time td after said start time t0 has passed, then registering the spatial positions of all of the detected teats before said predefined time td has passed, and deriving, by using of said control system, a dedicated treating action for said treating device, effective to move said treating device through a dedicated path defined by said registered spatial teat positions of said individual animal, and initiating and carrying out said dedicated treating action of all said teats by movement of said treating device through said dedicated path and thereafter ending said treatment operation,
  - (ii) when said predefined time td has passed after at least one said spatial positions and before all said spatial positions of all the teats have been detected, then immediately halting any further detection of said spatial teat positions and registering the spatial position of each detected teat, and deriving, by using said control system, an adapted treating action for said teat treating device and said individual animal, effective to move said treating device through an adapted path defined by said registered spatial teat positions, said adapted path being additionally defined, for undetected teat positions, by approximated spatial locations, and initiating and carrying out said adapted treating action of all said teats by movement of said treating device through said adapted path and thereafter ending said treatment operation, and
  - (iii) when said predefined time td has passed before any said spatial position of the teats has been detected, then immediately halting any further detection of said spatial teat positions and deriving a default treating action for said treating device and said individual animal, effective to move said treating device through a default treating path, and initiating and carrying out said default treating action of all said teats by movement of said treating device through said default treating path and thereafter ending said treatment operation,
- wherein said robot is a pre-treatment robot or a post-treatment robot, said treatment operation is a pre-treatment operation or a post-treatment operation, and said treatment location is a pre-treatment location or a post-treatment location.

14. The automatic teat-treatment apparatus according to claim 13, wherein said robot is associated with a rotary platform and detects passage of successive animal stalls on the rotary platform.

15. The automatic teat-treatment apparatus according to claim 13, wherein said robot is a stand-alone robot.

16. The automatic teat-treatment apparatus according to any claim 13, wherein said imaging apparatus is provided on said robot arm.

17. The automatic teat-treatment apparatus according to claim 13, wherein said robot is a pre-treatment robot, said treatment operation is a pre-treatment operation, and said treatment location is a pre-treatment location.

18. The automatic teat-treatment apparatus according to claim 13, wherein said robot is a post-treatment robot, said treatment operation is a post-treatment operation, and said treatment location is a post-treatment location.

* * * * *